(12) United States Patent
Yoshioka et al.

(10) Patent No.: US 11,675,302 B2
(45) Date of Patent: Jun. 13, 2023

(54) IMAGE FORMING APPARATUS CONFIGURED TO SET CONTROL VALUE

(71) Applicant: CANON KABUSHIKI KAISHA, Tokyo (JP)

(72) Inventors: Mahito Yoshioka, Shizuoka (JP); Masaki Shimomura, Shizuoka (JP); Kenta Inaba, Kanagawa (JP); Kuniaki Kasuga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/192,018

(22) Filed: Mar. 4, 2021

(65) Prior Publication Data
US 2021/0278791 A1    Sep. 9, 2021

(30) Foreign Application Priority Data

Mar. 5, 2020 (JP) .............................. JP2020-038118

(51) Int. Cl.
*G03G 15/00* (2006.01)
*G03G 15/20* (2006.01)
*H04N 1/00* (2006.01)

(52) U.S. Cl.
CPC ..... *G03G 15/5062* (2013.01); *G03G 15/2039* (2013.01); *G03G 15/2064* (2013.01);
(Continued)

(58) Field of Classification Search
CPC ....... G03G 15/2042; G03G 2215/2035; G03G 15/2053; G03G 15/2039; G03G 15/55
See application file for complete search history.

(56) References Cited

U.S. PATENT DOCUMENTS

2005/0262394 A1* 11/2005 Yasukawa ........... G06F 11/0748
                                                            714/E11.026
2006/0209347 A1*  9/2006 Nagaishi .............. H04N 1/4057
                                                            358/3.12
(Continued)

FOREIGN PATENT DOCUMENTS

JP       2013-033167 A     2/2013
JP          5164458 B2     3/2013
(Continued)

OTHER PUBLICATIONS

Extended European Search Report dated Aug. 20, 2021, in European Patent Application No. 21160627.2.

*Primary Examiner* — Jessica L Eley
(74) *Attorney, Agent, or Firm* — Venable LLP

(57) ABSTRACT

An image forming apparatus includes an image forming unit configured to form an image on a recording material based on first image data; a controller configured to control an image forming operation by the image forming unit; an acquisition unit configured to acquire property information related to a property of the recording material; a setting unit configured to set a control value to be used in the image forming operation; a reader configured to read an image formed on the recording material by the image forming unit and to output second image data; and a comparison unit configured to compare the first image data to the second image data, wherein the setting unit is further configured to set the control value based on a comparison result from the comparison unit and the property information.

16 Claims, 14 Drawing Sheets

(52) U.S. Cl.
CPC ......... *G03G 15/55* (2013.01); *H04N 1/00092* (2013.01); *G03G 2215/00738* (2013.01); *G03G 2215/00742* (2013.01)

(56) References Cited

U.S. PATENT DOCUMENTS

| | | | |
|---|---|---|---|
| 2010/0053384 A1* | 3/2010 | Manabe | H04N 5/205 348/E5.022 |
| 2013/0100467 A1 | 4/2013 | Miyazaki | |
| 2013/0148987 A1* | 6/2013 | Arakawa | G06K 9/3216 399/15 |
| 2014/0064803 A1* | 3/2014 | Okabayashi | G03G 15/2064 399/329 |
| 2018/0039213 A1 | 2/2018 | Endoh et al. | |
| 2020/0016907 A1 | 1/2020 | Ogushi | |

FOREIGN PATENT DOCUMENTS

| | | |
|---|---|---|
| JP | 2016-153855 A | 8/2016 |
| JP | 2019-015874 A | 1/2019 |
| JP | 2020-006628 A | 1/2020 |

* cited by examiner

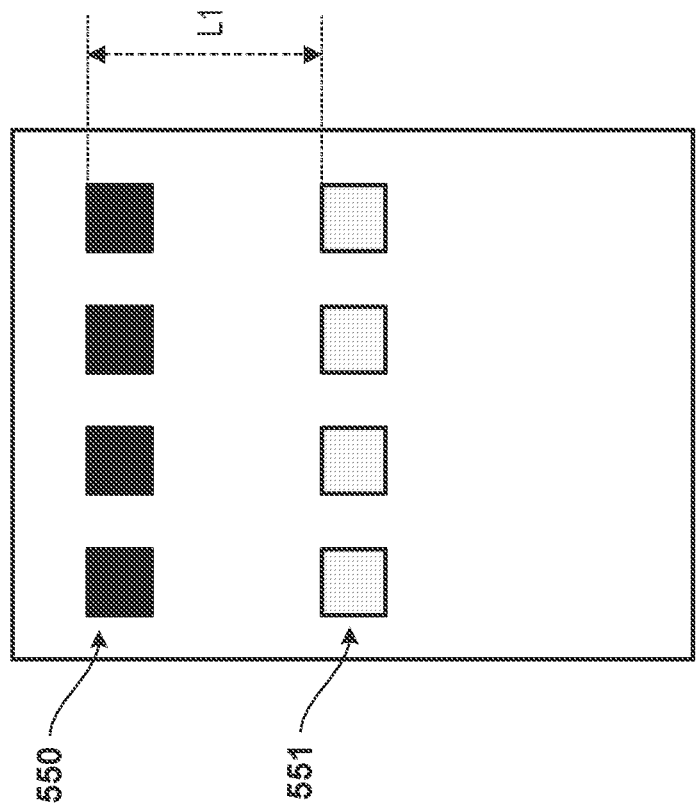
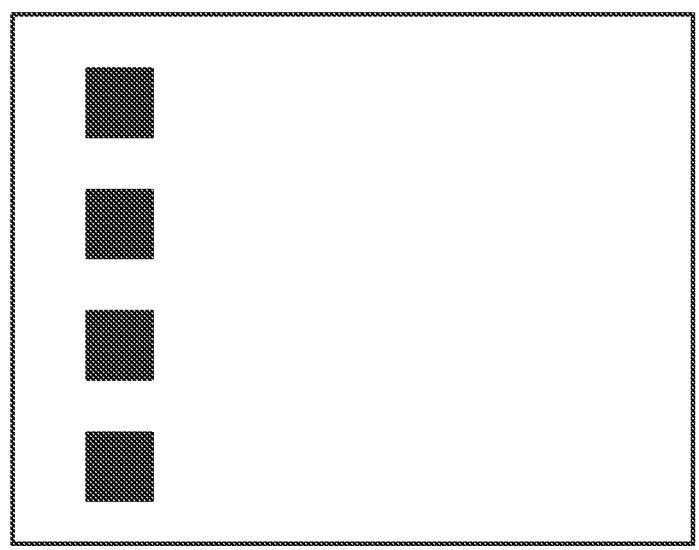

FIG. 5A

| BASIS WEIGHT w (g/m³) | BASE TEMPERATURE Tb (°C) |
|---|---|
| w<65 | 160 |
| 65≦w<100 | 180 |
| 100≦w | 200 |

FIG. 5B

| BASIS WEIGHT w (g/m³) | UPPER LIMIT OF CORRECTED TEMPERATURE ΔT (°C) (WHEN REDUCE TEMPERATURE) |
|---|---|
| w<65 | 9 |
| 65≦w<100 | 6 |
| 100≦w | 3 |

FIG. 5C

| BASIS WEIGHT w (g/m³) | UPPER LIMIT OF CORRECTED TEMPERATURE ΔT (°C) (WHEN INCREASE TEMPERATURE) |
|---|---|
| w<65 | 3 |
| 65≦w<100 | 6 |
| 100≦w | 9 |

FIG. 7

| IMAGE DEFECT | CONTROL CONTENT | |
|---|---|---|
| | w<80 | 80≤w |
| NON-NORMAL TONER ADHERENCE | FIXING TEMPERATURE | DEVELOPING BIAS VOLTAGE |
| VOID IMAGE | SECONDARY TRANSFER BIAS VOLTAGE | FIXING TEMPERATURE |

FIG. 9

| IMAGE FORMING | IMAGE FORMING APPARATUS 111 | IMAGE FORMING APPARATUS 112 | IMAGE FORMING APPARATUS 113 | IMAGE FORMING APPARATUS 114 |
|---|---|---|---|---|
| IMAGE FORMING CONFIGURATION | SAME | SAME | DIFFERENT | DIFFERENT |
| MEDIA SENSOR | HAS | DOES NOT HAVE | HAS | DOES NOT HAVE |
| READER | DOES NOT HAVE | DOES NOT HAVE | DOES NOT HAVE | DOES NOT HAVE |

F I G. 10
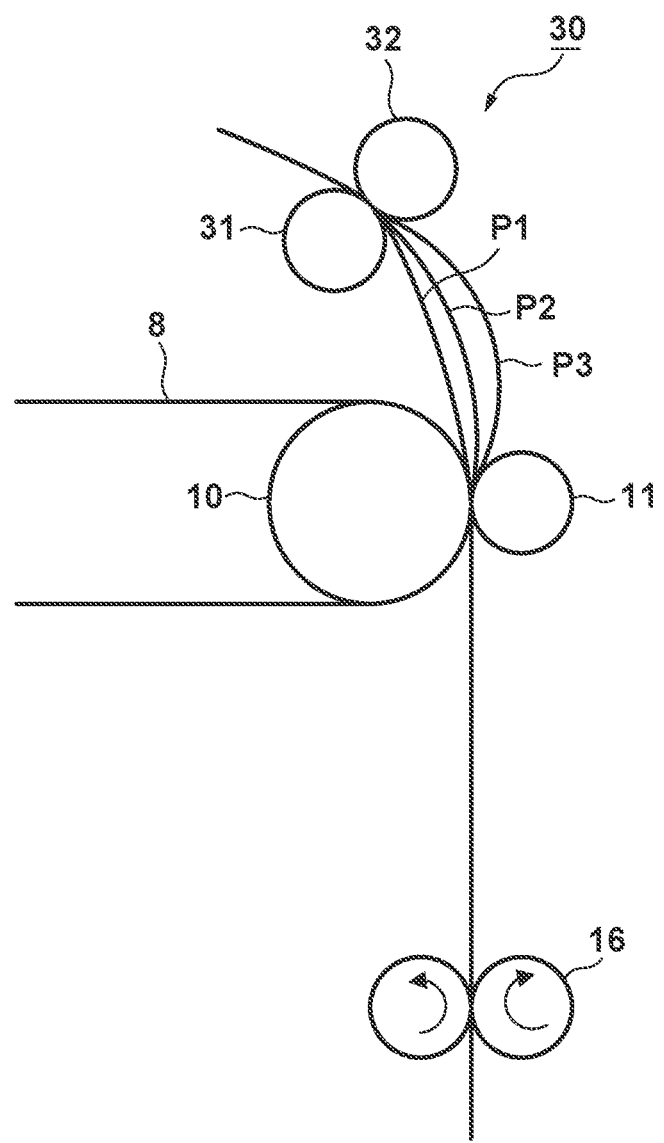

FIG. 12A

| ARCHING STATE | PLAIN PAPER | PRESSURE ROLLER CORRECTION CONTROL |
|---|---|---|
| P1 | DOES NOT HAVE TRANSFER BLUR | DOES NOT HAVE |
| P2 | DOES NOT HAVE TRANSFER BLUR | DOES NOT HAVE |
| P3 | INFREQUENTLY TRANSFER BLUR OCCURS | DOES NOT HAVE |

FIG. 12B

| ARCHING STATE | CARDBOARD | PRESSURE ROLLER CORRECTION CONTROL |
|---|---|---|
| P1 | DOES NOT HAVE TRANSFER BLUR | DOES NOT HAVE |
| P2 | HAS TRANSFER BLUR | +5% |
| P3 | HAS TRANSFER BLUR | +10% |

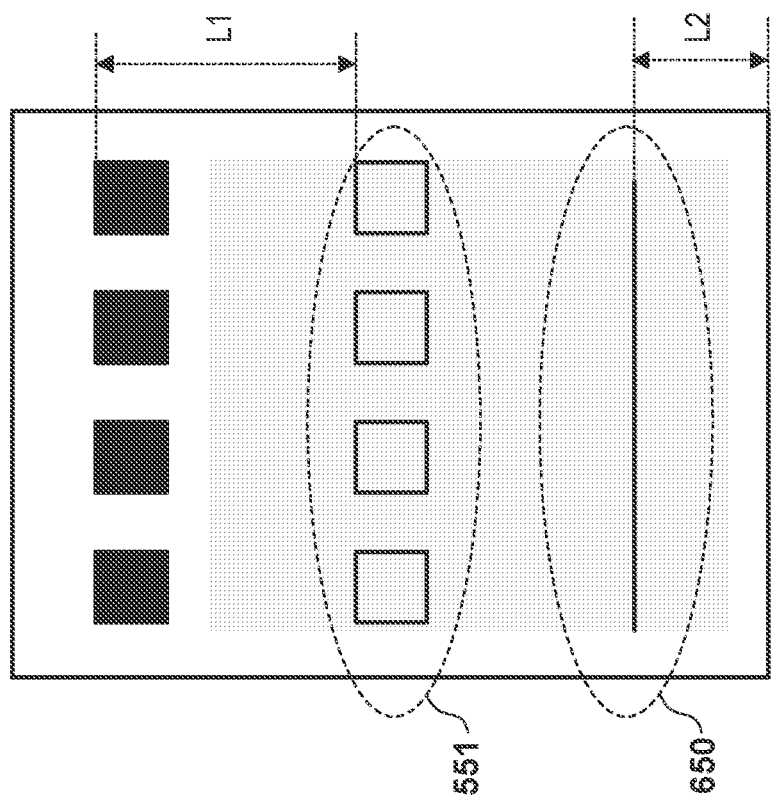
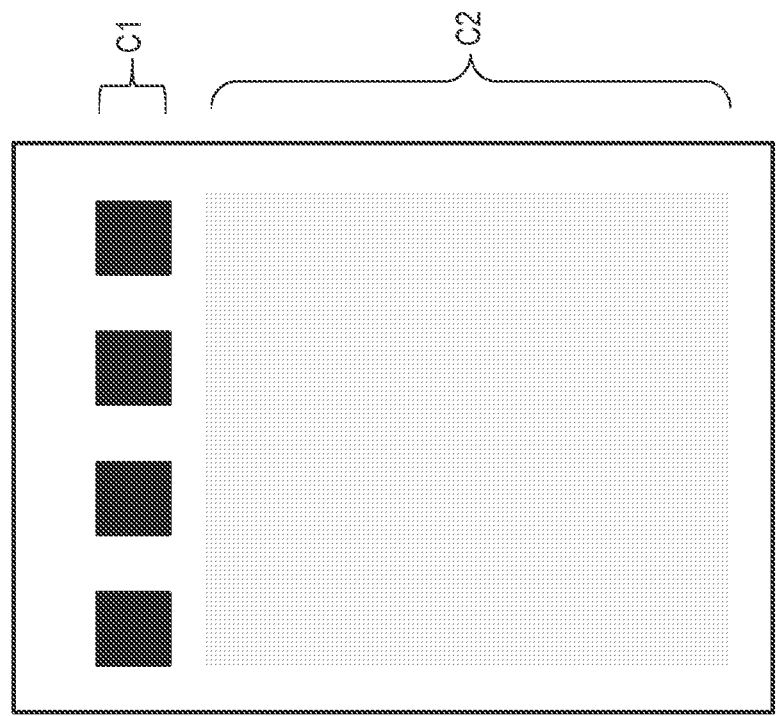

IMAGE FORMING APPARATUS CONFIGURED TO SET CONTROL VALUE

BACKGROUND OF THE INVENTION

Field of the Invention

The present invention relates to an image forming apparatus configured to read a formed image to control an image forming operation.

Description of the Related Art

To determine whether an image defect has occurred, an image forming apparatus that optically reads an image formed on a recording material has been proposed. Japanese Patent No. 5164458 discloses a configuration in which the periodicity of an image defect is determined by reading an image formed on a plurality of recording materials, and a rotating member that generates the image defect is identified based on the determined periodicity. US-2018-039213 discloses a configuration in which an image formed on a recording material based on image data is read, and an image indicated by the image data is compared to the image formed on the recording material to recognize a state of consumable items or the like.

For example, when an image formed on a recording material is read to determine a type of an image defect, and an image forming operation is changed so as to suppress the image defect of the determined type, another image defect may occur.

SUMMARY OF THE INVENTION

According to an aspect of the present disclosure, an image forming apparatus includes: an image forming unit configured to form an image on a recording material based on first image data; a controller configured to control an image forming operation by the image forming unit; an acquisition unit configured to acquire property information related to a property of the recording material; a setting unit configured to set a control value to be used in the image forming operation; a reader configured to read an image formed on the recording material by the image forming unit, and to output second image data; and a comparison unit configured to compare the first image data to the second image data, wherein the setting unit is further configured to set the control value based on a comparison result from the comparison unit and the property information.

Further features of the present invention will become apparent from the following description of exemplary embodiments with reference to the attached drawings.

BRIEF DESCRIPTION OF THE DRAWINGS

FIGS. 4A and 4B are explanatory views of hot offset.

FIG. 5A is a diagram showing an example of a relationship between a basis weight and a base temperature.

FIGS. 5B and 5C are diagrams each of which shows an example of a relationship between the basis weight and an upper limit of a correction temperature.

FIG. 7 is a diagram showing an example of control content for combinations of image defect types and basis weights.

FIG. 9 is an explanatory view of differences among the configurations of the respective image forming apparatuses.

FIG. 10 is an explanatory view of arching control.

FIGS. 12A and 12B are diagrams showing relationships among recording material types, transfer blur, and control content.

FIGS. 14A and 14B are diagrams illustrating images for detecting an image defect according to an embodiment.

DESCRIPTION OF THE EMBODIMENTS

Figure 1:
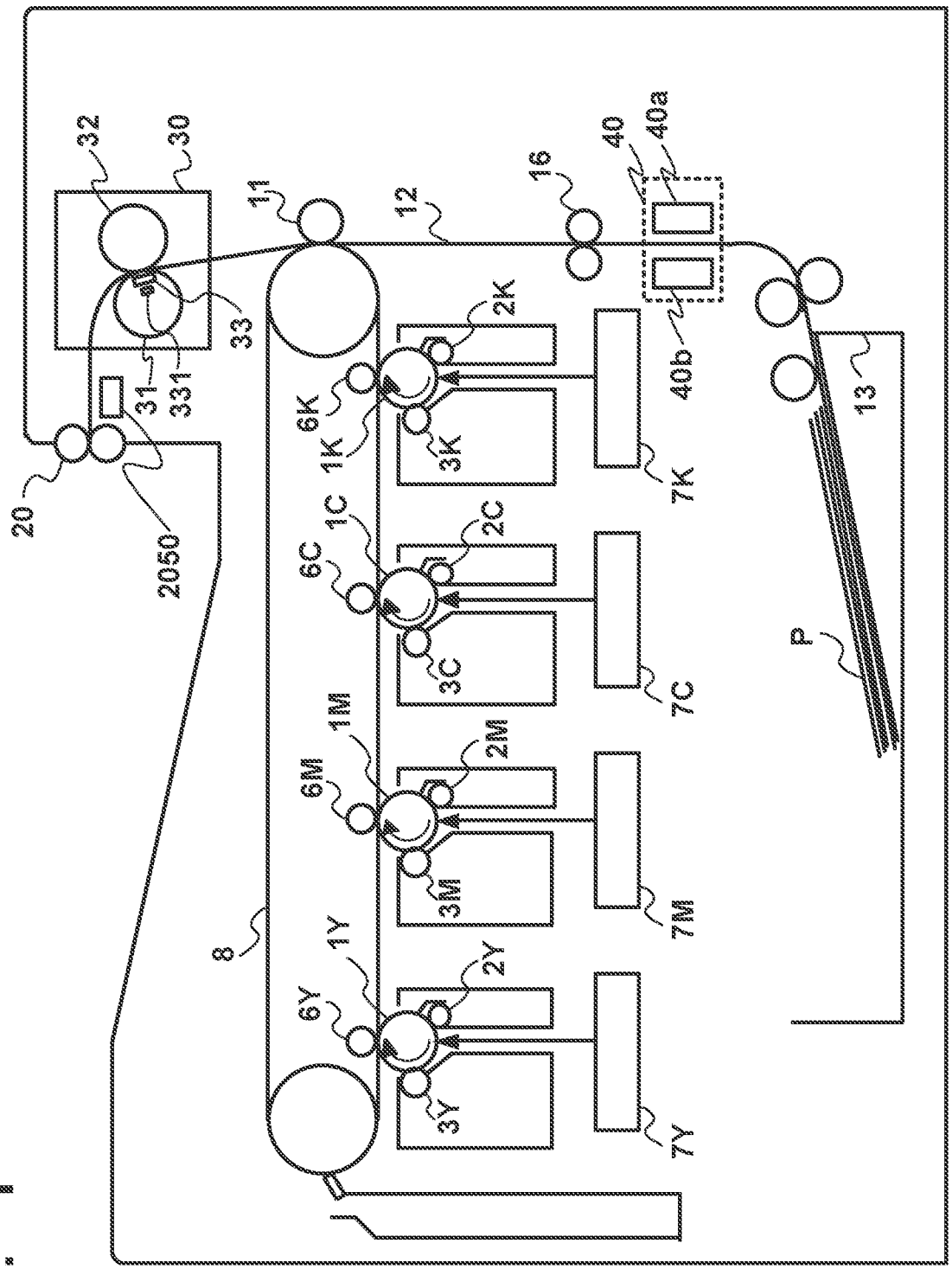
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a configuration diagram of an image forming apparatus according to the present embodiment. Note that the characters Y, M, C, and K at the end of the reference signs in FIG. 1 indicate that the colors of the toner images, formed by participation of the members indicated by the reference signs, are yellow, magenta, cyan, and black, respectively. However, in the following description, when it is not necessary to distinguish colors, reference signs in which the last character is omitted are used. Each of photoconductors 1 is rotationally driven in a clockwise direction in the figure when forming an image. A charging roller 2 charges the surface of the corresponding photoconductor 1 to a uniform potential by outputting a charging bias voltage. An exposing device 7 forms an electrostatic latent image on the photoconductor 1 by exposing the corresponding photoconductor 1 based on image data. A developing roller 3 outputs a developing bias voltage to thereby cause toner to adhere onto the electrostatic latent image on the corresponding photoconductor 1, and thus forms a toner image on the photoconductor 1. A primary transfer roller 6 outputs a primary transfer bias voltage to transfer the toner image formed on the corresponding photoconductor 1 to an intermediate transfer belt 8. Here, it is possible to form a full-color toner image on the intermediate transfer belt 8 by transferring the toner images formed on the respective photoconductors 1 to the intermediate transfer belt 8 in an overlapping manner.

The intermediate transfer belt 8 is rotationally driven in a counterclockwise direction in the figure during image forming. Thus, the toner image transferred onto the intermediate transfer belt 8 is conveyed to a position facing a secondary transfer roller 11. On the other hand, a recording material P in a cassette 13 is fed to a conveyance path 12, and is then conveyed to the position facing the secondary transfer roller 11 by a plurality of rollers including registration rollers 16. The secondary transfer roller 11 outputs a secondary transfer bias voltage to transfer the toner image on the intermediate transfer belt 8 to the recording material P. After the transfer of the toner image, the recording material P is conveyed to a fixing device 30. The fixing device 30 includes a fixing film 31, and a pressure roller 32 that is pressed against the fixing film 31. Further, a fixing heater 33 that is a heating member configured to heat the fixing device 30, and a thermistor 331 that measures the temperature of the fixing heater 33 are provided in the fixing film 31. The fixing device 30 fixes the toner image onto the recording material P by pressurizing the recording material P by using the fixing film 31 and the pressure roller 32 and heating the recording material P by using the fixing heater 33. The recording material P on which the toner image has been fixed is discharged to the outside of the image forming apparatus by discharge rollers 20.

Figure 2:
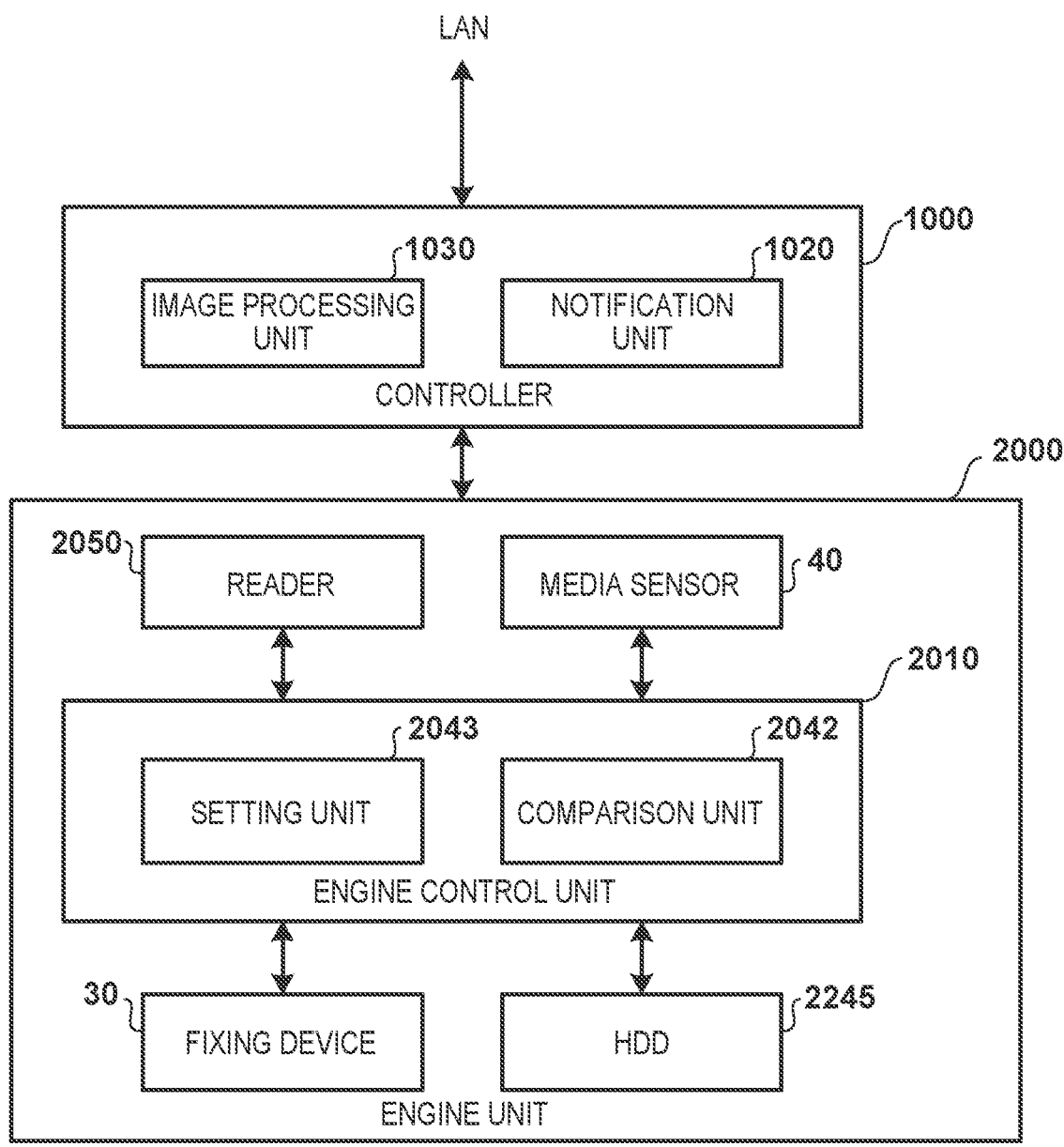
FIG. 2 is a control block diagram of the image forming apparatus according to an embodiment.

In addition, the image forming apparatus includes a reader 2050 that optically reads a surface of the recording material P between the fixing device 30 and the discharge rollers 20. The reader 2050 has, for example, a light emitting element and a contact image sensor (CIS) (not illustrated). The reader 2050 outputs the read image data of the surface of the recording material P to an engine control unit 2010 (FIG. 2). Further, the image forming apparatus includes a media sensor 40. The media sensor 40 has an LED 40a and a CMOS area sensor 40b that are disposed opposite to each other with respect to the conveyance path 12. In the present embodiment, the media sensor 40 is provided on the upstream side from the registration rollers 16 in the conveyance direction of the recording material. The CMOS area sensor 40b receives light emitted by the LED 40a through the recording material P being conveyed through the conveyance path 12, and outputs a signal indicating a received light amount to the engine control unit 2010 (FIG. 2). Since a transmitted light amount is different depending on a basis weight of the recording material P, the engine control unit 2010 can determine the basis weight of the recording material based on the received light amount.

Note that the fixing film 31 of the fixing device 30 is an endless film-shaped member provided with an elastic layer and a surface layer on an outer circumferential surface of a base layer. The elastic layer is formed from an elastic material having heat resistance such as silicon rubber or the like, in order to improve the fixing properties and to make the glossiness uniform. The surface layer is formed from a material having good releasability, and having heat resistance, such as fluorine resin, for the purpose of improving the separability from the recording material and suppressing an offset of toner. A thickness of the surface layer of the fixing film 31 is reduced by use. The pressure roller 32 has a core shaft portion, at least one or more elastic layers, and a surface layer. The elastic layer is formed from an elastic material having heat resistance such as silicon rubber or fluororubber. The surface layer is formed from a material having good releasability, and having heat resistance such as fluororesin or the like, in order to prevent contamination by toner or paper powder.

FIG. 2 is a control block diagram of the image forming apparatus according to the present embodiment. Note that in FIG. 2, only the functional blocks necessary for the description of the present embodiment are illustrated. A controller 1000 receives image information from a host computer via a local area network (LAN). An image processing unit 1030 converts the image information received from the host computer into image data having a format to be used by the image forming apparatus, and outputs the converted image data to an engine unit 2000. The controller 1000 includes a notification unit 1020 configured to notify a user of a state and the like of the image forming apparatus.

An engine control unit 2010 of the engine unit performs image forming control on the printing material P as explained using FIG. 1 based on the image data received from the controller 1000. The engine control unit 2010 controls the reader 2050, the media sensor 40, and the fixing device 30. A hard disk drive (HDD) 2245 is a storage unit that stores information. For example, the image data received from the controller 1000 and image data read by the reader 2050 are stored in the HDD 2245. Note that in the following description, the image data read by the reader 2050 is expressed as "read image data", and is distinguished from the image data received from the controller 1000. The HDD 2245 also stores various types of information that is used in the present embodiment. A comparison unit 2042 compares the image data with the read image data to determine whether or not an image defect has occurred in the image formed on the recording material P. A setting unit 2043 sets and updates various control values (set values) related to an image forming operation. For example, the setting unit 2043 sets a target temperature of the fixing heater 33. Based on a detection result of the thermistor 331, the engine control unit 2010 controls a temperature of the fixing heater 33 such that the temperature of the fixing heater 33 becomes the target temperature set by the setting unit 2043.

Figure 3:
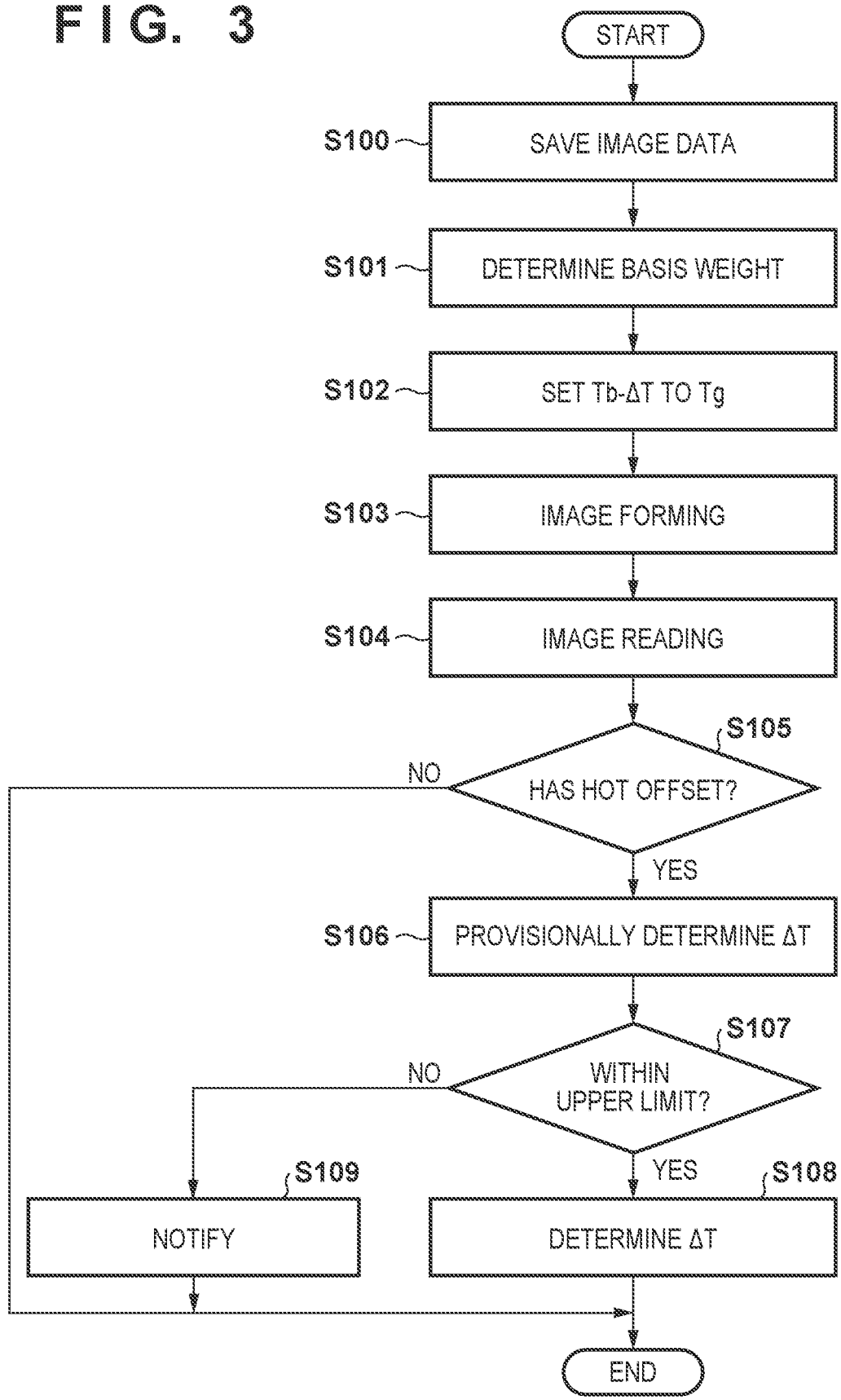
FIG. 3 is a flowchart of target temperature setting processing according to an embodiment.

FIG. 3 is a flowchart related to target temperature setting control. Note that FIG. 3 illustrates processing in a case where an image defect to be detected is a hot offset. The hot offset is an image defect generated because the toner of the recording material P adheres to the fixing film 31 to cause the adhering toner to be transferred again to the recording material P. FIG. 4A is an image indicated by image data, and FIG. 4B illustrates a state in which a hot offset has occurred in the image formed based on the image data. The toner indicated by a reference sign of 551 in FIG. 4B is in a state where the toner indicated by a reference sign of 550 adheres to the recording material P through the fixing film 31, that is, in a state where the toner indicated by the reference sign of 550 adheres to the recording material P due to a hot offset. Note that L1 corresponds to a circumferential length of the fixing film 31. The hot offset occurs because the temperature of the fixing film 31 increases due to thinning of the surface layer of the fixing film 31. The engine control unit 2010 controls the temperature of the fixing heater 33 so as to become the target temperature, but when thinning of the surface layer of the fixing film 31 occurs, the temperature of the fixing film 31 when the fixing heater 33 is brought to the target temperature may be higher than the appropriate range. In this case, the hot offset occurs.

When receiving a print job, the engine control unit 2010 performs the processing in FIG. 3 each time image data of an image to be formed on one recording material is received from the controller 1000. First, the engine control unit 2010 stores image data received from the controller 1000 in the HDD 2245 in S100. In S101, the engine control unit 2010 determines a basis weight of the recording material P based on a detection result of the recording material P by the media sensor 40 when the recording material P reaches a detection region of the media sensor 40. The determined basis weight of the recording material P is stored in the HDD 2245.

In S102, the setting unit 2043 first determines a base temperature Tb (base value) corresponding to the basis weight determined in S101. FIG. 5A shows a correspondence relationship between the basis weight and the base temperature Tb. In this example, the basis weight is evaluated by using two threshold values in three levels. In this example, the two respective threshold values are "65" and "100". For example, the base temperature Tb corresponding to the basis weight of "80" in FIG. 5A is 180. In addition, the setting unit 2043 manages a correction temperature ΔT (correction value) for each basis weight level (three in this example). An initial value of the correction temperature ΔT for each level is 0. Note that, a configuration in which the correction temperature ΔT for each level is updated to the initial value of 0 when one print job is completed, and a configuration in which the correction temperature ΔT at the end of the print job is used in the next print job may be applicable. The setting unit 2043 sets a target temperature Tg of the fixing heater 33 to a value obtained by subtracting the correction temperature ΔT of the level to which the basis weight belongs, from the base temperature Tb corresponding to the basis weight determined in S101.

Thereafter, in S103, the engine control unit 2010 forms an image on the recording material based on the image data while controlling the temperature of the fixing heater 33 so as to become the target temperature Tg. Thereafter, in S104, the engine control unit 2010 causes the reader 2050 to read the image on the recording material P, acquires the read image data, and stores the read image data in the HDD 2245. In S105, the comparison unit 2042 compares the image data stored in the HDD 2245 with the read image data, and determines whether a hot offset has occurred based on the comparison result.

Figure 6:
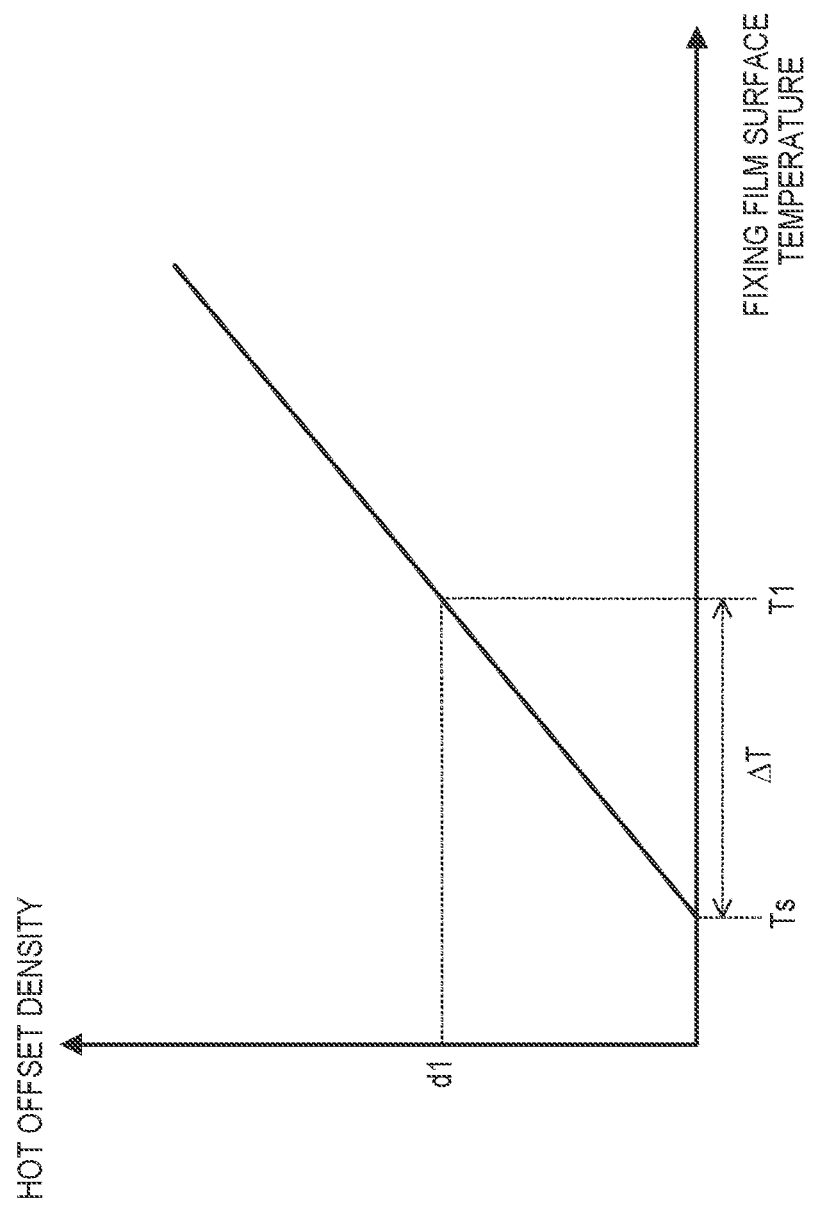
FIG. 6 is an explanatory view of a method of determining the correction temperature.

In a case where the engine control unit 2010 determines that a hot offset has not occurred, the engine control unit 2010 terminates the processing in FIG. 3. In this case, the correction temperature ΔT belonging to the level of the basis weight of the recording material P on which the image has been formed is not changed. On the other hand, in a case where the engine control unit 2010 determines that a hot offset has occurred, the engine control unit 2010 provisionally determines, in S106, the correction temperature ΔT that belongs to the level of the basis weight of the recording material P on which the image has been formed. A method of determining the updated correction temperature ΔT will be described below using FIG. 6. As illustrated in FIG. 6, a surface temperature of the fixing film 31 and a density of a hot offset are in a proportional relationship. Additionally, the hot offset does not occur when the surface temperature of the fixing film 31 is lower than or equal to a threshold temperature Ts. The engine control unit 2010 determines a density dl of toner that has adhered to the recording material P due to the hot offset, and estimates a surface temperature T1 of the fixing film 31 from the relationship illustrated in FIG. 6. Then, in S106, the engine control unit 2010 provisionally determines a difference between the estimated surface temperature T1 and the threshold temperature Ts as the updated corrected temperature ΔT. Note that a configuration may be applicable in which a value obtained by adding a predetermined margin to the difference between the estimated surface temperature T1 and the threshold temperature Ts is provisionally determined as the correction temperature ΔT. In addition, in this example, the correction temperature ΔT has been determined based on the density of the toner that has adhered to the recording material P due to the hot offset, but an area of the toner that has adhered to the recording material P due to the hot offset can be also used.

In the present embodiment, an upper limit is provided for an absolute value of the correction temperature ΔT for each level. FIG. 5B shows an example of the upper limit value for each level. As shown in FIG. 5B, the lower the basis weight is, the larger the upper limit value is set. The reason why the lower the basis weight is, the larger the upper limit value is set is that the occurrence of adverse effects according to the correction temperature ΔT varies depending on the basis weight of the recording material P. Specifically, in a case of a relatively thin recording material P having a small basis weight, the fixing margin with respect to the fixing temperature is large, and thus, even when the correction temperature ΔT is made large, the adverse effects are small. On the other hand, in a case of a relatively thick recording material P having a large basis weight, the fixing margin with respect to the fixing temperature is small, and the adverse effects may occur when the correction temperature ΔT is made large.

The engine control unit 2010 determines, in S107, whether or not the provisionally determined correction temperature ΔT is within the upper limit. When the provisionally determined correction temperature ΔT is within the upper limit value, the engine control unit 2010 updates, in S108, the correction temperature ΔT to the correction temperature ΔT determined in S106. On the other hand, when the provisionally determined correction temperature ΔT exceeds the upper limit value, the engine control unit 2010 notifies the user of the occurrence of the image defect and the replacement of the fixing device 30 via the notification unit 1020 of the controller 1000. Note that in this case, the processing in FIG. 3 is terminated without updating the correction temperature ΔT.

Note that although the processing in FIG. 3 suppresses the hot offset that occurs by an increase in the fixing temperature, the present invention can be similarly applied to an image defect generated by a decrease in the fixing temperature. For example, when the fixing temperature becomes too low, an image defect (void image) may occur in which toner does not adhere to a high-density region to which the toner is to adhere. In this case, in S102 in FIG. 3, the target temperature Tg is determined by adding the correction temperature ΔT to the base temperature Tb. Furthermore, the correction temperature ΔT for each level is provided with an upper limit value as illustrated in FIG. 5C. In FIG. 5C, the larger the basis weight is, the larger the upper limit value of the correction temperature ΔT is set. Note that the reason why the larger the basis weight is, the larger the upper limit value of the correction temperature ΔT is set is that, as the basis weight is small, the resistance to thermal stress deteriorates, so that increasing the correction temperature ΔT increases the possibility of the occurrence of adverse effects such as curling or winding around the fixing device 30.

In the present embodiment, the base temperature Tb corresponding to the basis weight of the recording material P is corrected by the correction temperature ΔT to be set as the target temperature Tg of the fixing heater 33. Note that, in a case where an image defect has occurred in the image formed on the recording material P, the correction temperature ΔT is set based on the degree of the image defect. The image defect is determined by reading the image formed on the recording material P. Note that the upper limit value of the correction temperature ΔT is provided corresponding to the basis weight. By providing the upper limit value of the correction temperature ΔT based on the basis weight, it is possible to suppress adverse effects caused by changing the fixing temperature.

Note that the determination and update of the correction temperature ΔT may be performed each time an image is formed on the predetermined number of recording materials P. Additionally, the occurrence of an image defect is determined each time an image is formed on the recording material P, and the correction temperature ΔT is determined, but a configuration may be applicable in which each time an image is successively formed on the predetermined number of recording materials P, the correction temperature ΔT is updated to an average value of the correction temperature ΔT determined each time. As a result, the frequency of changing the image forming conditions can be made moderate.

Additionally, in the present embodiment, the basis weight of the recording material P is used as property information related to the properties of the recording material P, but a configuration may be applicable in which the roughness and glossiness of the surface of the recording material P are used as the property information. In addition, in the present embodiment, the target temperature of the fixing heater 33 is controlled, but the present invention can also be applied to setting of other control values such as the secondary transfer bias voltage. That is, the control value related to the image forming operation is not limited to the target temperature of the fixing heater 33 described in the present embodiment, and can be, for example, a target value of the secondary transfer bias voltage. The present invention can also be applied not only to the color image forming apparatus illustrated in FIG. 1, but also to a monochrome image forming apparatus. Furthermore, the present invention is applicable not only to an electrophotographic image forming apparatus, but also to ink ejection control and the like of an ink-jet image forming apparatus.

Second Embodiment

Next, the second embodiment will be described focusing on differences from the first embodiment. In the first embodiment, description has been made focusing on the control of the fixing temperature in a case where a hot offset has occurred as an image defect. In the present embodiment, the type of an image defect is determined by comparing image data to read image data, and a control target is selected based on the determined type of the image defect and the basis weight. An example is shown in FIG. 7. As shown in FIG. 7, for example, in a case where an image defect is generated in which toner adheres to a region to which the toner is not to adhere (non-normal toner adherence), the fixing temperature is controlled when the basis weight of the recording material P is smaller than 80. In other words, this is similar to the first embodiment. On the other hand, in a case where the non-normal toner adherence occurs, when the basis weight of the recording material P is equal to or larger than 80, control of a developing bias voltage is performed under the estimation that so-called development fog has occurred, rather than a hot offset. As described in the first embodiment, adverse effects due to the fact that the larger the basis weight is, the lower the fixing temperature is made are likely to occur. Therefore, when the basis weight is large, identification of the cause and control correction can be quickly performed by controlling the developing bias voltage in advance.

In addition, as shown in FIG. 7, for example, in a case where an image defect (void image) has occurred in which toner does not adhere to a high-density region to which the toner is to adhere, the fixing temperature is controlled when the basis weight of the recording material P is equal to or larger than 80. In other words, it is determined that a fixing failure has occurred, similarly to the first embodiment. On the other hand, in a case where a void image has occurred, when the basis weight of the recording material P is smaller than 80, control of the secondary transfer bias voltage is performed under estimation that a so-called secondary transfer defect has occurred, rather than the fixing failure. As described in the first embodiment, as the basis weight is small, adverse effects due to increasing the fixing temperature are likely to occur. Thus, when the basis weight is small, the secondary transfer bias voltage can be controlled in advance to quickly identify the cause and to correct the control.

Note that, for example, when the roughness of the surface of the recording material P is large, a risk that a secondary transfer failure occurs increases, so the surface properties of the recording material P are detected to prioritize control in which the secondary transfer bias is made high. In this way, an item for which control is to be changed can be set according to the properties of the recording material P to be detected.

As described above, the control target is changed based on a combination of the type of the image defect, that is, a comparison result by the comparison unit 2042, and the property information of the recording material. According to this configuration, it is possible to quickly perform the identification of the cause of the image defect and the correction control.

Third Embodiment

Figure 8:
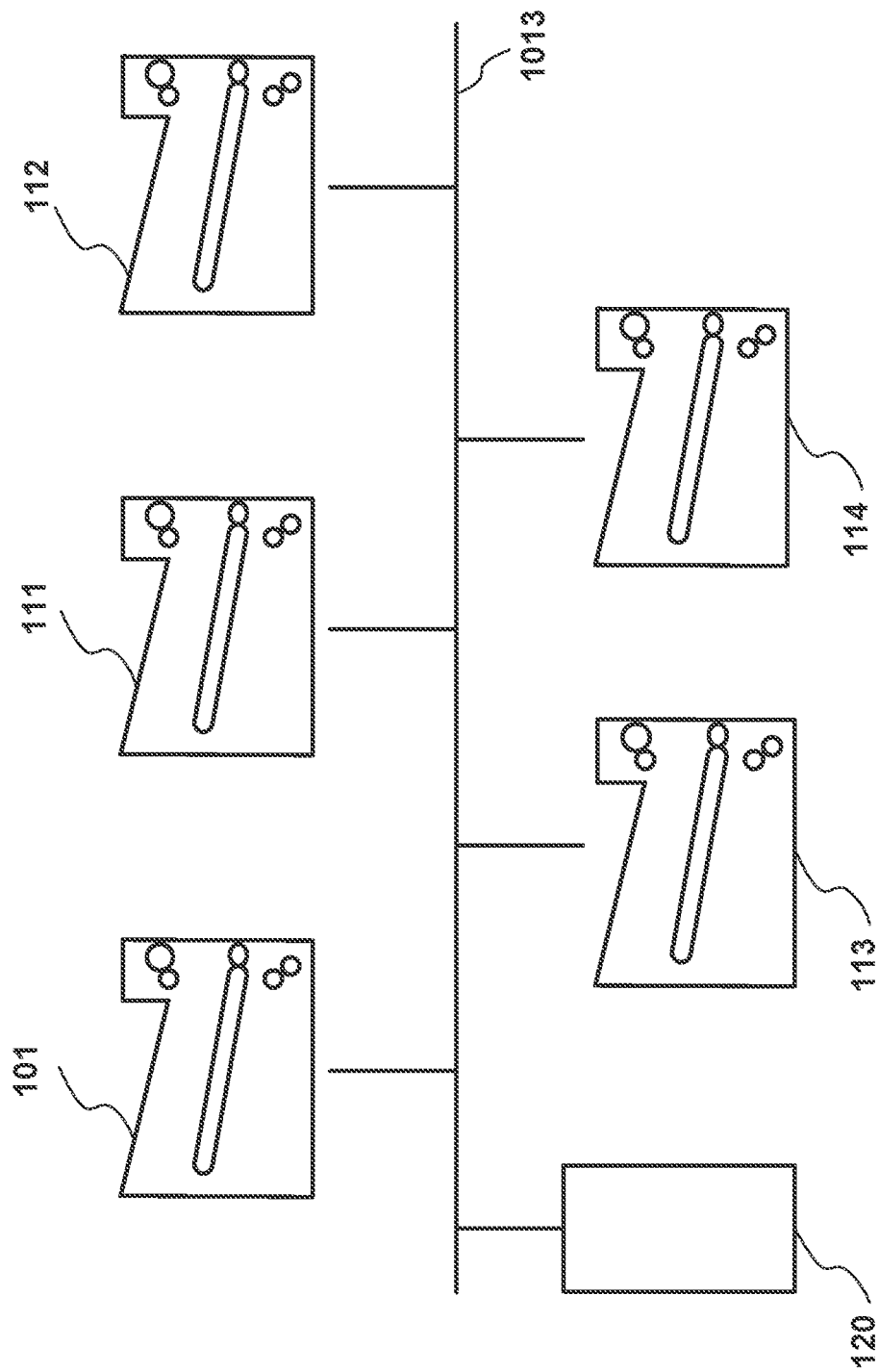
FIG. 8 is a configuration diagram of an image forming system according to an embodiment.

Next, a third embodiment will be described focusing on differences from the first embodiment and the second embodiment. As illustrated in FIG. 8, in the present embodiment, a plurality of image forming apparatuses 101, and 111 to 114, and an HDD apparatus 120 are connected to a LAN 1013. Note that, in the present embodiment, the image forming apparatus 101 is similar to the image forming apparatus described in the first embodiment and the second embodiment. In contrast, the image forming apparatuses 111 to 114 have differences from the image forming apparatus 101.

FIG. 9 indicates differences between the image forming apparatus 101 and each of the image forming apparatuses 111 to 114. As indicated in FIG. 9, the image forming apparatus 111 differs from the image forming apparatus 101 in that the image forming apparatus 111 does not have the reader 2050. The image forming apparatus 112 differs from the image forming apparatus 101 in that the image forming apparatus 112 does not have the reader 2050 and the media sensor 40. Furthermore, the image forming apparatus 113 has a different image forming configuration from the image forming apparatus 101, and differs from the image forming apparatus 101 in that the image forming apparatus 113 does not include the reader 2050. Furthermore, the image forming apparatus 114 has a different image forming configuration from the image forming apparatus 101, and differs from the image forming apparatus 101 in that the image forming apparatus 114 does not include the reader 2050 and the media sensor 40. Note that the different image forming configuration means that, for example, the configuration itself related to image forming, such as transferring a toner image directly from each of the photoconductors 1 to the recording material P without using the intermediate transfer belt 8, is different. Additionally, the different image forming configuration also means that the configuration itself is basically similar to that in FIG. 1, but the configurations and materials of the respective members are different.

The image forming apparatus 101 stores, in the HDD apparatus 120 via the LAN 1013, history data indicating a relationship between the correction temperature ΔT associated with the level of the basis weight and the number of recording materials P (hereinafter, the cumulative number) on which an image has been formed. Each of the image forming apparatuses 111 to 114 can acquire the history data indicating the relationship between the cumulative number stored in the HDD apparatus 120 and the correction temperature ΔT via the LAN 1013. Note that, as described in the first embodiment, the correction temperature ΔT varies according to the level of the basis weight.

Since the image forming apparatus 111 does not have the reader 2050, the image forming apparatus 111 cannot determine an image defect by using read image data. However, since the image forming apparatus 111 includes the media sensor 40, the image forming apparatus 111 can acquire the basis weight of the recording material P. Accordingly, the image forming apparatus 111 can determine the correction temperature ΔT according to the basis weight based on the history data acquired from the HDD apparatus 120. Note that the correction temperature ΔT to be used is a value corresponding to the cumulative number in the image forming apparatus 111.

Since the image forming apparatus 112 does not have the media sensor 40, the image forming apparatus 112 cannot detect the basis weight of the recording material P. However, a managed print service (hereinafter, abbreviated as MPS) that performs centralized management of a plurality of image forming apparatuses placed in an office has recently been provided. In the MPS environment, management may be performed by a "management user" providing the service, together with the management of recording mediums. Thus, when the type of the recording material P to be used in the office is assumed to be the same, the image forming apparatus 112 can determine the correction temperature ΔT based on the history data stored in the HDD apparatus 120. Furthermore, when the user sets the type of the recording material P, the correction temperature ΔT can be determined based on the history data stored in the HDD apparatus 120 and the basis weight corresponding to the type.

The image forming apparatus 113 has the media sensor 40, and thus, can acquire the basis weight of the recording material P. However, since the image forming configuration of the image forming apparatus 113 is different from that of the image forming apparatus 101, the correction temperature ΔT used by the image forming apparatus 101 cannot be used as it is. However, by previously determining a conversion method from the correction temperature ΔT in the image forming apparatus 101 to the correction temperature ΔT in the image forming apparatus 113 while considering differences in image forming configuration between the image forming apparatus 101 and the image forming apparatus 113, the image forming apparatus 113 can determine the correction temperature ΔT.

Since the image forming apparatus 114 does not have the media sensor 40, the image forming apparatus 114 cannot detect the basis weight of the recording material P, and has a different image forming configuration from that of the image forming apparatus 101, similarly to the image forming apparatus 113. However, similarly to the image forming apparatus 112, when the type of the recording material P to be used in the office is assumed to be the same, the image forming apparatus 114 can determine the basis weight. Additionally, similarly to the image forming apparatus 113, the correction temperature ΔT stored in the HDD apparatus 120 can be converted and used.

As described above, according to the present embodiment, a first image forming apparatus stores, in the HDD apparatus 120, the history data indicating the relationship among the cumulative number, the correction temperature ΔT, and the basis weight (properties) of the recording material. According to this configuration, even in a case of a second image forming apparatus that does not have the reader 2050, the correction temperature ΔT can be determined based on the basis weight of the recording material on which an image is formed and the cumulative number. Furthermore, even in a case of a third image forming apparatus that does not have the reader 2050 and in which image forming is different from that of the first image forming apparatus, the correction temperature ΔT can be determined based on the basis weight of the recording materials on which an image is formed and the cumulative number. Note that the third image forming apparatus converts the correction temperature ΔT stored in the HDD apparatus 120 in accordance with a predetermined conversion method. Note that the conversion method is predetermined based on differences in image forming configuration between the first image forming apparatus and the third image forming apparatus. Furthermore, even in a case of a fourth image forming apparatus that does not have the media sensor 40, when a recording material having similar properties is assumed to be used, the correction temperature ΔT can be determined based on the cumulative number.

Note that instead of providing the HDD apparatus 120, a configuration may be applicable in which the history data is stored in the image forming apparatus 101. In this case, the image forming apparatuses 111 to 114 acquire the correction temperature ΔT by accessing the image forming apparatus 101. In other words, the image forming apparatus 101 provides the history data to the image forming apparatuses 111 to 114.

Fourth Embodiment

Next, a fourth embodiment will be described, focusing on differences from the first embodiment to the third embodiment. FIG. 10 illustrates a portion from the registration rollers 16 to the fixing device 30. In the image forming apparatus, in order to stabilize the conveyance of the recording material P, the recording material P is deflected between the secondary transfer roller 11 and the fixing device 30 as illustrated by a reference sign P1 (an arching state P1) in FIG. 10 (hereinafter, referred to as arching control). The arching control is performed by adjusting a rotational speed of the pressure roller 32. However, the pressure roller 32 that has exceeded an expected lifetime may reduce the rubber hardness, and reduce the outer diameter. As a result, the conveying speed of the recording material by the pressure roller 32 is reduced, and the desired amount of arching cannot be maintained. As a result, as illustrated by a reference sign P2 (arching state P2) and a reference sign P3 (arching state P3) in FIG. 10, an arch having a desired amount of arching or larger can be formed.

Figure 11B:
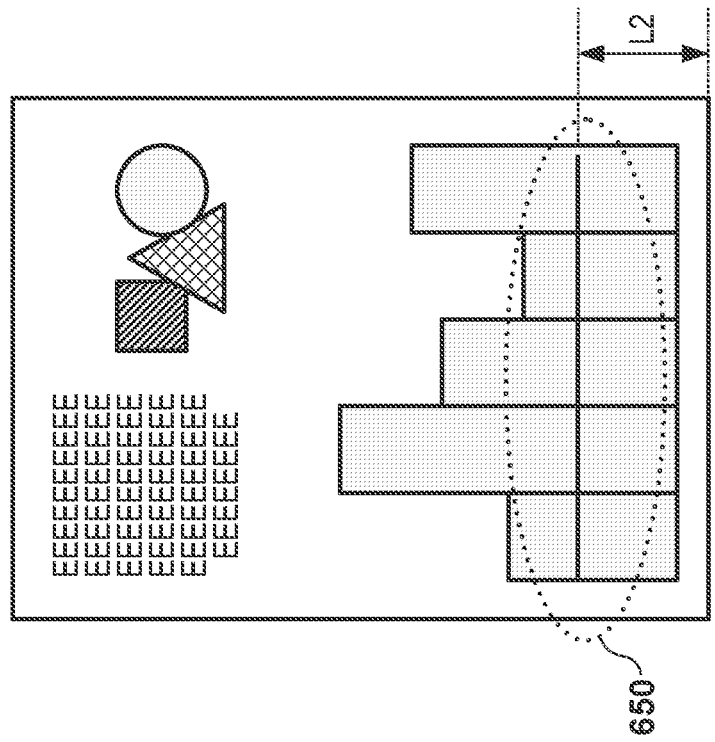
FIGS. 11A and 11B are explanatory views of transfer blur.
Figure 11A:
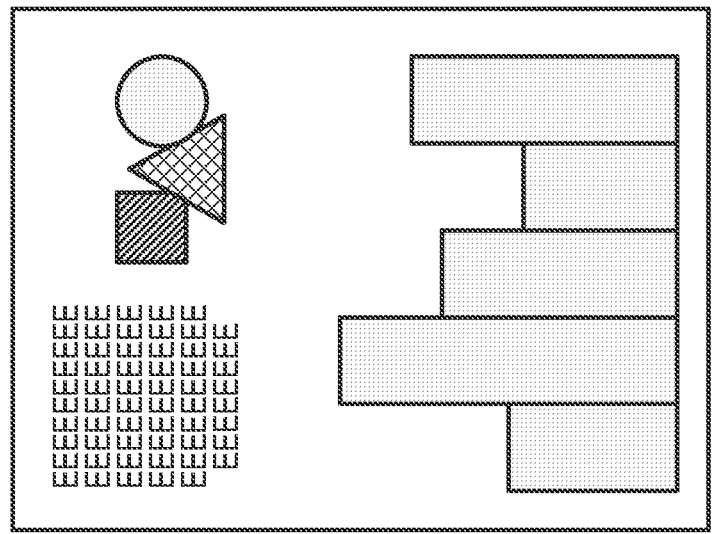

In the configuration of the image forming apparatus, the pinching and conveying force of the recording material caused by the secondary transfer roller 11 and the intermediate transfer belt 8 is smaller than that of the registration rollers 16 and the fixing device 30. Thus, the stress stored in the recording material P in the arching state is released at the moment when the rear end of the recording material P passes through the registration rollers 16. As in the arching states P2 and P3, when the amount of arching is large, the stress to be released also increases, and at the moment when the rear end of the recording material P passes through the registration rollers 16, the conveying speed of the recording material may change. At this time, transfer blur may occur. FIG. 11A is an image that is indicated by image data, and FIG. 11B illustrates a state in which transfer blur occurs in the image that is indicated by the image data illustrated in FIG. 11A. In FIG. 11B, expansion and contraction of the image occur at a position at a distance L2 from the rear end of the recording material P. Note that the distance L2 is a distance between the registration rollers 16 and the secondary transfer roller 11. As a result, a stripe-like density difference 650 occurs in a direction orthogonal to the conveyance direction of the recording material.

FIG. 12A shows a relationship between a plain paper sheet having a basis weight w=80 and transfer blur, and FIG. 12B shows a relationship between a cardboard sheet having a basis weight w=220 and transfer blur. As shown in FIG. 12A, in the plain paper, no transfer blur occurs in the arching states P1 and P2. However, in a case of the arching state P3, negligible transfer blur may infrequently occur. However, the transfer blur infrequently occurs in the arching state P3 when the image forming apparatus is unexpectedly used, such as when the image forming apparatus continues to be used over its expected lifetime. That is, unless the image forming apparatus is unexpectedly used, the transfer blur does not occur in a case where the basis weight w is equal to or smaller than 80. On the other hand, as indicated in FIG. 12B, in a case of the cardboard sheet, transfer blur does not occur in the arching state P1, but transfer blur occurs in the arching states P2 and P3. In this way, whether or not transfer blur occurs depends on, in addition to the degree of arching state, the basis weight of the recording material. This is because the stress stored in the recording material in the arching state increases as the basis weight increases.

In the present embodiment, the correction control in which the rotational speed of the pressure roller 32 is made larger than the reference rotational speed is performed to suppress the transfer blur. First, as indicated in FIG. 12B, in the arching states P2 and P3 in the case of the cardboard sheet, the rotational speed of the pressure roller 32 is corrected. Note that, in the case of the arching state P2, the rotational speed of the pressure roller 32 is made 5% faster than the reference rotational speed. On the other hand, in the case of the arching state P3, the rotational speed of the pressure roller 32 is made 10% faster than the reference rotational speed. Note that, in the case of the arching state P1, the correction is not performed because transfer blur does not occur.

On the other hand, as illustrated in FIG. 12A, in the case of the plain paper sheet, the correction control of the rotational speed of the pressure roller 32 is not performed regardless of the arching state. As described above, transfer blur infrequently occurs in the arching state P3, but this is only a case when the image forming apparatus is unexpectedly used. This is also because other adverse effects may occur when the correction control is performed in order to suppress transfer blur caused by such unexpected use. Specifically, this is because, when the correction control is performed in order to reduce the amount of arching, adverse effects such as image rubbing due to excessive pulling of the recording material may easily occur.

Figure 13:
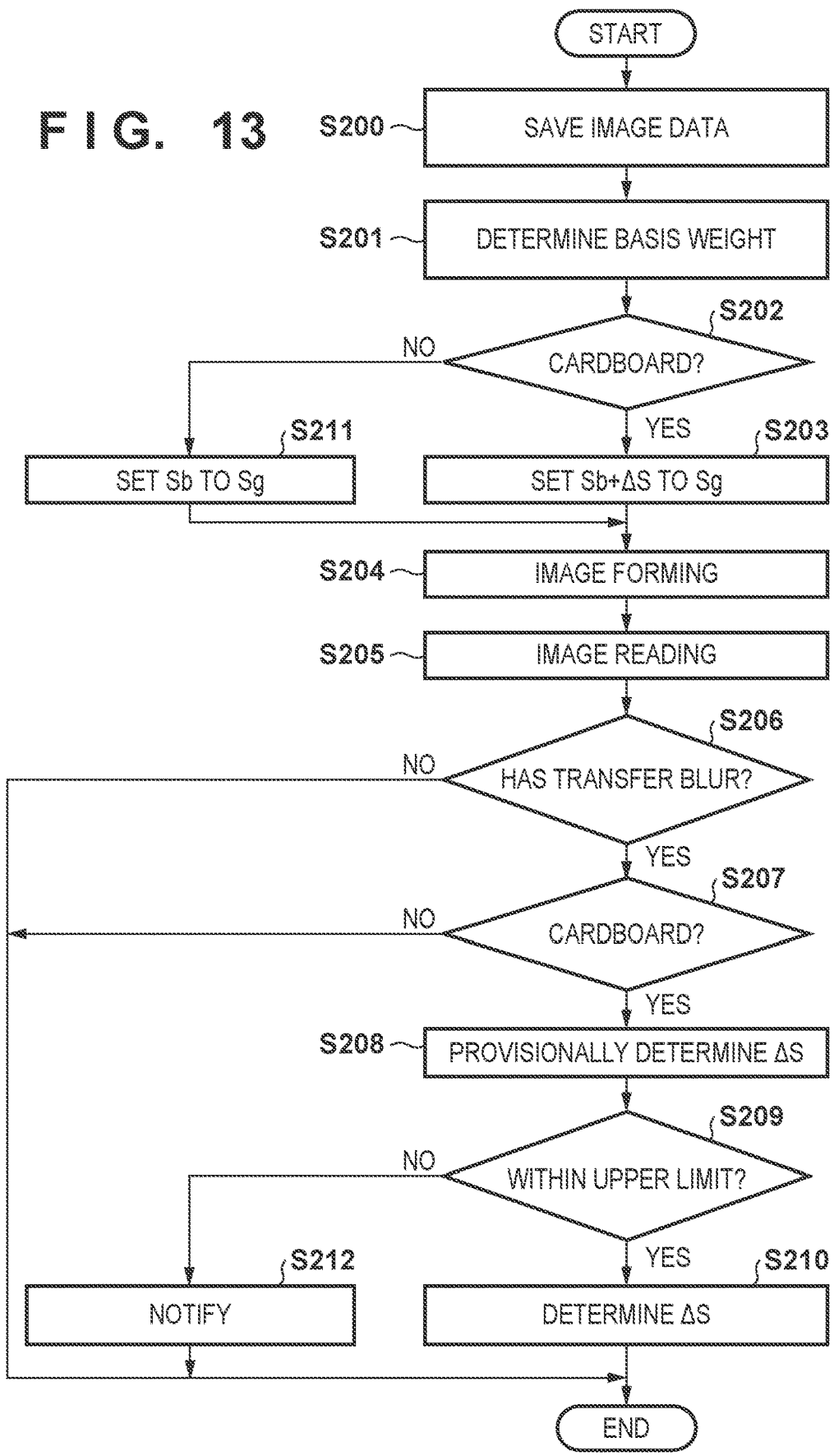
FIG. 13 is a flowchart of rotational speed setting processing of a pressure roller according to an embodiment.

FIG. 13 is a flow chart related to rotational speed setting control of the pressure roller 32. The engine control unit 2010 performs processing in FIG. 13 each time image data is received from the controller 1000. First, the engine control unit 2010 stores the image data received from the controller 1000 in the HDD 2245, in S200. The engine control unit 2010 determines the basis weight of the recording material P based on the detection result of the recording material P by the media sensor 40 when the recording material P reaches the detection region of the media sensor 40 in S201, and determines whether the recording medium P is a plain paper sheet or a cardboard sheet in S202. When the plain paper sheet is used, the setting unit 2043 sets a target rotational speed Sg to a base rotational speed Sb (base value) in S211. On the other hand, when the cardboard sheet is used, the setting unit 2043 sets the target rotational speed Sg to a speed obtained by adding a correction value ΔS to the base rotational speed Sb in S203. The correction value ΔS is a value indicating an increasing amount of the base rotational speed Sb, and its initial value is 0.

Thereafter, the engine control unit 2010, in S204, forms an image on the recording material based on the image data while controlling the rotational speed of the pressure roller 32 so as to become the target rotational speed Sg. Thereafter, in S205, the engine control unit 2010 causes the reader 2050 to read the image on the recording material P, acquires the read image data, and stores the read image data in the HDD 2245. In S206, the comparison unit 2042 compares the image data stored in the HDD 2245 with the read image data to determine whether transfer blur has occurred or not. For example, the comparison unit 2042 can determine that the transfer blur has occurred when a density difference, which is not present in the image based on the original image data, occurs in the image based on the read image data in a width direction orthogonal to the conveyance direction. Note that the density difference in the width direction occurs at around the distance L2 from the rear end of the recording material, so the comparison unit 2042 can determine whether or not the transfer blur has occurred by determining whether or not the density difference occurs at around the distance L2 from the rear end of the recording material.

In a case where the engine control unit 2010 determines that the transfer blur has not occurred, the engine control unit 2010 terminates the processing in FIG. 13. In this case, the correction value ΔS is not changed. On the other hand, in a case where the engine control unit 2010 determines that the transfer blur has occurred, the engine control unit 2010 determines whether the recording material being conveyed in S207 is the cardboard sheet or the plain paper sheet. Since the correction value ΔS is for the cardboard sheet, when the recording material is the plain paper sheet, the engine control unit 2010 terminates the processing in FIG. 13. Note that, in this case, the engine control unit 2010 stores, in the HDD 2245, the fact that the transfer blur has occurred in the plain paper sheet.

On the other hand, when the recording material is determined to be the cardboard sheet in S207, the engine control unit 2010 provisionally determines the correction value ΔS in S208. Note that, in S206, the engine control unit 2010 can determine only whether or not the transfer blur has occurred, and cannot determine whether the arching state is P2 or P3. Thus, in the present embodiment, whether the arching state is P2 or P3 is determined depending on whether or not the transfer blur has occurred in the plain paper sheet. Specifically, when information about the fact that the transfer blur has occurred in the plain paper sheet is stored in the HDD 2245, the engine control unit 2010 determines that the arching state is P3. That is, the engine control unit 2010 determines that the arching state is P3 in a case where the transfer blur has occurred in both the plain paper sheet and the cardboard sheet. Thus, as shown in FIG. 12B, the correction value ΔS is increased by 10%. On the other hand, when the information about the fact that the transfer blur has occurred in the plain paper sheet is not stored in the HDD 2245, the engine control unit 2010 determines that the arching state is P2. Thus, the correction value ΔS is increased by 5% as shown in FIG. 12B.

As with the first embodiment, the upper limit value of the correction value ΔS is also provided in the present embodiment. This is because, when the rotational speed of the pressure roller 32 is too high, adverse effects such as image rubbing due to excessive pulling of the recording material may easily occur. The engine control unit 2010 determines whether or not the provisionally determined correction value ΔS is within the upper limit value in S209. When the provisionally determined correction value ΔS is within the upper limit value, the engine control unit 2010, in S210, updates the correction value ΔS to the correction value ΔS determined in S208. On the other hand, when the provisionally determined correction value ΔS exceeds the upper limit value, the user is notified of the occurrence of the image defect and the replacement of the fixing device 30 and/or each of the conveyance rollers, via the notification unit 1020 of the controller 1000. Note that, in this case, the processing in FIG. 13 is terminated without updating the correction value ΔS.

As described above, when the image defect is determined, the correction value for the control value related to the image forming is determined based on the basis weight of the recording material. According to this configuration, the occurrence of an image defect different from the determined image defect can be suppressed.

Note that in the present embodiment, setting of the rotational speed of the pressure roller 32 for the two basis weights of the plain paper sheet and the cardboard sheet has been described, but the levels of the basis weight can be any two or more levels. In addition, in the present embodiment, the basis weight of the recording material is used as property information, but the thickness or stiffness of the recording material may also be used as the property information. For example, even when the basis weight is the same, since there is a recording material having different stiffness because of the material and the method, any number of combinations among the basis weight, thickness, and stiffness of the recording material can be used as the property information.

Furthermore, a configuration is possible in which a detection image for detecting an image defect is used instead of an image to be formed by the user on the recording material. FIG. 14A illustrates an example of the detection image. The detection image has an image C1 for detecting a hot offset and a halftone image C2 for detecting transfer blur. In FIG. 14B, a reference sign of 551 denotes toner that has adhered to the recording material due to a hot offset, and a reference sign of 650 denotes a region where a density difference occurs due to transfer blur. By using the detection image as illustrated in FIG. 14A, the occurrence of a plurality of image defects can be detected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038118, filed Mar. 5, 2020, which is hereby incorporated by reference herein in its entirety.

What is claimed is:

1. An image forming apparatus, comprising:
   an image forming unit configured to form an image on a recording material based on first image data;
   a controller configured to control an image forming operation by the image forming unit;
   an acquisition unit configured to acquire property information related to a property of the recording material;
   a setting unit configured to set a control value to be used in the image forming operation to a first value based on the property information acquired by the acquisition unit;
   a reader configured to read an image formed on the recording material by the image forming unit in a case where the control value is set to the first value, and to output second image data; and
   a comparison unit configured to compare the first image data to the second image data,
   wherein the setting unit is further configured to determine a correction value based on a comparison result from the comparison unit, and to change the control value from the first value to a second value based on the first value and the correction value, wherein
   an upper limit value corresponding to the property information is set for the correction value, and
   a first upper limit value corresponding to first property information is different from a second upper limit value corresponding to second property information.

2. The image forming apparatus according to claim 1, further comprising:
   a storage unit configured to store history data indicating a relationship among a cumulative number of recording materials on which the image forming unit forms an image, the property information of the recording material, and the correction value; and
   a providing unit configured to provide the history data stored by the storage unit to another image forming apparatus connected via a network.

3. The image forming apparatus according to claim 1, further comprising:

a storage unit configured to store history data among a cumulative number of recording materials on which the image forming unit forms an image, the property information of the recording material, and the correction value in an external apparatus connected via a network.

4. The image forming apparatus according to claim 1, further comprising a notification unit configured to notify a user of information related to the comparison result when the correction value determined based on the comparison result exceeds the upper limit value.

5. The image forming apparatus according to claim 1, wherein
the property information is at least one of a basis weight, a thickness, and stiffness of the recording material.

6. The image forming apparatus according to claim 1, wherein
the image forming unit includes:
a fixing unit configured to fix, to the recording material, the image that has been transferred to the recording material, and
the control value is a target temperature of a heating member of the fixing unit.

7. The image forming apparatus according to claim 1, wherein
the property information is a basis weight of the recording material,
when the setting unit changes the control value to the second value greater than the first value by adding the correction value to the first value, as the basis weight is low, the upper limit value becomes low, and
when the setting unit changes the control value to the second value less than the first value by subtracting the correction value from the first value, as the basis weight is low, the upper limit value becomes high.

8. The image forming apparatus according to claim 1, wherein
the comparison unit is further configured to determine whether or not an image defect has occurred in an image formed on the recording material by the image forming unit by comparing the first image data with the second image data.

9. The image forming apparatus according to claim 1, wherein
in a case where the correction value exceeds the upper limit value, the setting unit is configured not to change the control value, and in a case where the correction value does not exceed the upper limit value, the setting unit is configured to change the control value from the first value to the second value.

10. The image forming apparatus according to claim 1, wherein
the acquisition unit comprises a detection unit configured to detect the property of the recording material.

11. The image forming apparatus according to claim 1, wherein
the setting unit is further configured to set the correction value to a third value in a case where a difference of image density between the first image data and the second image data is a first difference value, and
the setting unit is further configured to set the correction value to a fourth value, which is less than the third value, in a case where the difference of image density between the first image data and the second image data is a second difference value, which is less than the first difference value.

12. An image forming apparatus, comprising:
a first image forming member and a second image forming member configured to form an image on a recording material based on first image data;
a controller configured to control an image forming operation by the first image forming member and the second image forming member;
an acquisition unit configured to acquire property information related to a property of the recording material;
a setting unit configured to set a control value to be used in the image forming operation;
a reader configured to read an image formed on the recording material by the first image forming member and the second image forming member, and to output second image data; and
a determination unit configured to determine whether or not an image defect has occurred based on the first image data and the second image data, wherein
the setting unit is further configured to change a first control value corresponding to the first image forming member in a case where the determination unit determines that the image defect has occurred and first property information has been acquired by the acquisition unit, and
the setting unit is further configured to change a second control value corresponding to the second image forming member in a case where the determination unit determines that the image defect has occurred and second property information, which is different from the first property information, has been acquired by the acquisition unit.

13. The image forming apparatus according to claim 12, wherein
the property information is at least one of a basis weight, a thickness, and stiffness of the recording material.

14. The image forming apparatus according to claim 12, wherein
the first image forming member is a fixing unit configured to fix, to the recording material, the image that has been transferred to the recording material,
the first control value is a target temperature of a heating member of the fixing unit,
the second image forming member is a developing unit configured to form the image on an image carrier, and
the second control value is a voltage applied to the developing unit.

15. The image forming apparatus according to claim 12, wherein
the first image forming member is a transfer unit configured to transfer an image to the recording material,
the first control value is a voltage applied to the transfer unit,
the second image forming member is a fixing unit configured to fix, to the recording material, the image that has been transferred to the recording material, and
the second control value is a target temperature of a heating member of the fixing unit.

16. The image forming apparatus according to claim 12, wherein
the acquisition unit comprises a detection unit configured to detect the property of the recording material.

* * * * *